Jan. 4, 1927.
J. H. BOURGON
1,613,077
BODY HARDWARE
Filed July 23, 1924
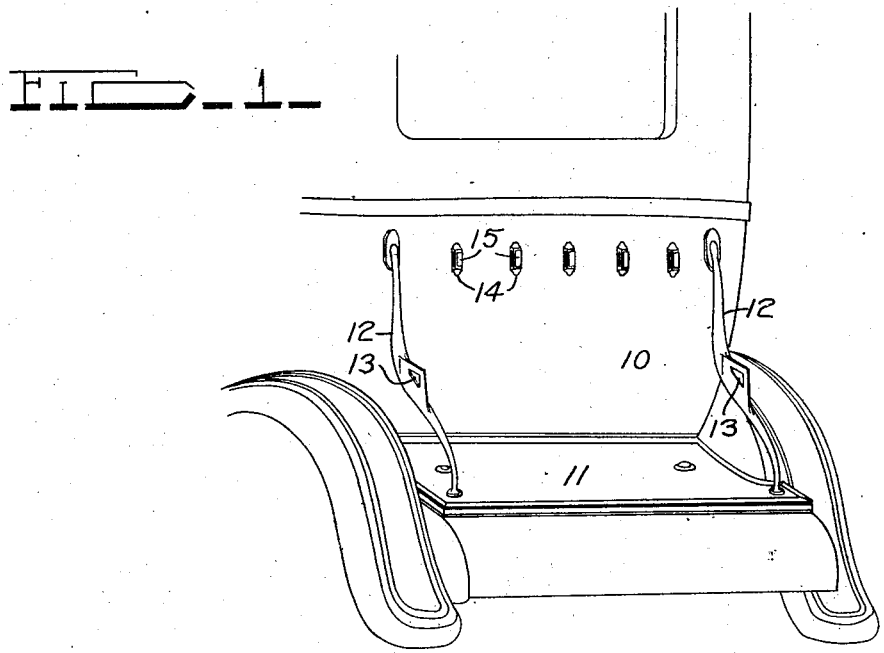
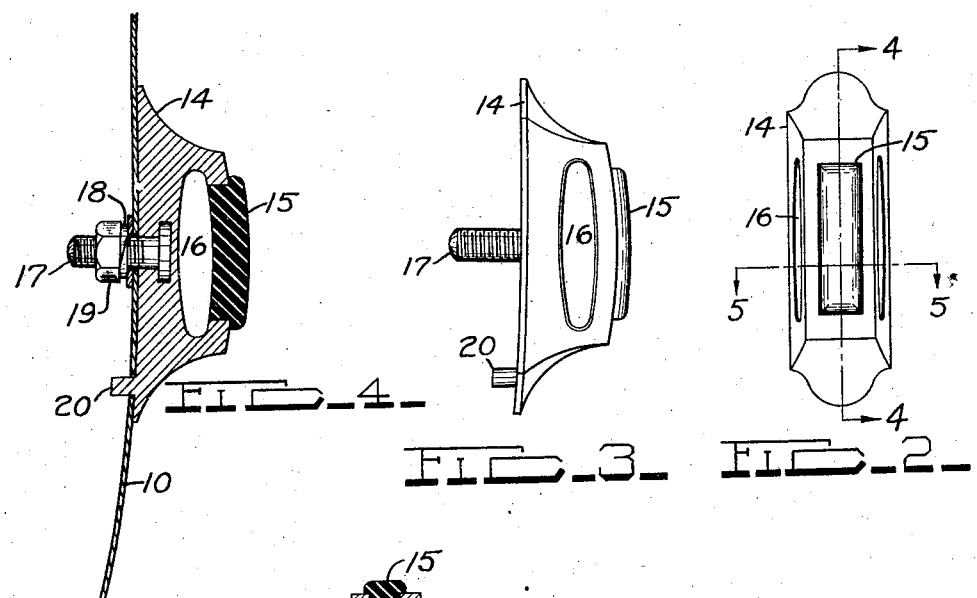
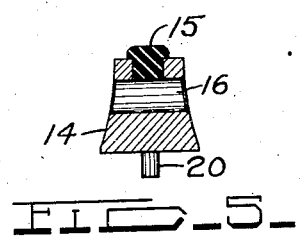
INVENTOR.
JOSEPH H. BOURGON
BY
ATTORNEYS.

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

BODY HARDWARE.

Application filed July 23, 1924. Serial No. 727,841.

This invention relates to automobiles and particularly to the passenger carrying type provided with means for carrying trunks and the like, and provided with hardware for holding such trunks or the like on the automobile without any danger of marring or scratching the finish thereof.

One of the objects of the invention is to provide a combined automobile panel protector and strap anchor.

Another object is to provide in combination with the rear panel of an automobile having a trunk-rack, a protecting device for attachment to said panel, said device providing an abutment for a trunk on the rack and being provided with means for passing a strap therethru to hold the trunk against the device.

A further object is to provide an automobile body panel protector which consists of a part adapted to project from the body panel and which is provided with an opening therethru for the passage of a strap, and a rubber face for contact with a trunk or other object, and being further provided with a stud projecting from the rear face thereof through the body panel for holding the protector thereto and a rearwardly extending projection eccentric to the stud and adapted to be received in an opening in the body panel for the purpose of preventing turning of the protector.

The above being among the objects of the present invention, the same consists of certain features of construction and combination of parts to be hereinafter described with reference to the accompanying drawing, and then claimed, having the above and other objects in view.

In the accompanying drawing which illustrates a suitable embodiment of the present invention, and in which like numerals refer to like parts thruout the several views, Figure 1 is a fragmentary perspective view of the rear end of an automobile incorporating a suitable embodiment of the present invention.

Figure 2 is an enlarged face view of one of the protectors shown on the automobile in Figure 1.

Figure 3 is a side view of the protector shown in Figure 2.

Figure 4 is a section of the protector taken on the line 4—4 of Figure 2, and

Figure 5 is a section of the protector taken on the line 5—5 of Figure 2.

The automobile, a fragment of which including the body rear panel 10 as shown in Figure 1, is provided with a conventional type of trunk-support or trunk-rack 11 projecting rearwardly therefrom for the purpose of carrying a trunk or other object, and although the present invention may be adapted for use in connection with other parts of the automobile, because of its peculiar adaptability for use in connection with a trunk-rack it is so shown to better illustrate the invention.

As in the conventional constructions a trunk (not shown) is adapted to be secured on the rack 11 and be carried thereby. Adjacent each outer rear corner of the rack 11 is secured an arm 12 which extends angularly upward and is secured to the body panel 10 at its upper end, acting to steady the trunk-rack and for another purpose hereinafter described. Each arm 12 mid-way its length is provided with an opening 13 through which a strap is adapted to be passed and over the top of the trunk which seats on the rack 11 between the arms 12, to hold the trunk securely on the support 11 and prevent bouncing of the same in a vertical direction. To prevent movement of the trunk in a horizontal direction and at the same time prevent it from rubbing against the body panel 10 and marring the finish thereof, the combined panel protector and strap anchor is provided which is the principal subject of this invention and which consists mainly of a body member 14 and rubber abutment 15. The body member 14, preferably of metal, which may be die cast for economy in production, is secured to the body panel 10, by means to be hereinafter described, in the position shown in Figure 1 adjacent the upper edge of the trunk to be carried on the rack 11. The forward face of the body member 14 is shaped to match the contour of that part of the panel 10 against which it abuts and extends rearwardly therefrom, the extending portion being provided with a horizontally extending opening 16 to receive a strap. A second opening extends forwardly from the rear face of the body member 14 into the opening 16 into which the rubber abutment element 15 is inserted and secured, the rear face of the abutment element 15 being provided with an outwardly extending flanged portion projecting rearwardly of the rear face of the body member 14. A screw or stud 17 cast into the body part 14 or otherwise suitably secured thereto passes forwardly through an opening in the body panel 10 and receives a washer 18 and nut 19 on the inner side thereof as shown in Figure 4 to secure the body member 14 firmly thereto. A small boss 20 projecting forwardly from the forward face of the body part 14 eccentric to the stud 17 is also adapted to enter an opening in the panel 10 and act as a means for preventing turning movement between the body part 14 and panel 10. In operation a strap is passed through the openings 16 of the several body members 14 and around the trunk, drawing the trunk against the rubber abutment elements 15 and securely holding it from movement in a horizontal direction to prevent marring of either the body panel 10 or the trunk.

Inasmuch, as it is desirable to remove the trunk from an automobile when not in use, it will be apparent that the present invention provides a means for readily securing a trunk to or removing it from its position on the rack 11, and is such as to particularly lend itself to a design pleasing to the eye when not in active use for the purpose specified.

As previously mentioned, I do not limit the invention to the particular location and specific use to that shown and described, but formal changes may be made in the specific embodiment shown in the drawing without departing from the spirit and substance of this invention the scope of which is commensurate with the appended claims.

What I claim is:—

1. In an automobile having a body and a trunk rack, means for securing a trunk on said rack against horizontal movement comprising a member secured to said body, said member having an opening therethrough to receive a strap, and a second opening in said member connecting with said first-named opening and extending transversely of said body to receive the reduced portion of a resilient abutment member adapted to be rigidly secured therein.

2. In combination with an automobile body, a combined strap anchor and package abutment comprising a member provided with a strap receiving opening extending substantially parallel to the face of said body, an opening connected with said first opening and extending transversely thereto adapted to receive a resilient abutment member, a stud, and a projection eccentric thereto attached to said member for securing the same to said body.

3. In combination with an automobile body, a combined strap anchor and package abutment comprising a member provided with a strap receiving opening formed to receive the flat face of the strap in substantially parallel relation to said body and a second opening connecting with said first opening, and an elongated resilient abutment member secured in said second opening with the major axis of its exposed face extending transversely of the face of said strap.

4. In combination with an automobile having a body and a trunk rack, a member secured to said body for holding a trunk on said rack against horizontal movement, said member having an elongated opening adapted to receive a strap, and a second elongated opening extending transversely to said first opening, and a resilient abutment member adapted to engage said trunk secured in said second opening.

5. A combined strap anchor and trunk abutment comprising a member provided with a strap receiving portion and a resilient face member, said member being further provided with a rearwardly projecting securing stud and a projection eccentric to said stud for holding said part in a predetermined position relative to the axis of said stud.

6. The combination with an automobile having a trunk rack and a body panel, of means for holding a trunk on said rack against horizontal movement, said means comprising a part projecting from said panel and being provided with a strap receiving portion and a resilient face providing a trunk abutment, a stud and a projection extending from said part, openings in said panel for receiving said stud and said projection, and a nut on said stud for drawing said part into close relationship with said panel.

7. A combination strap anchor and trunk abutment comprising a member having an elongated opening therein adapted to receive a strap, and a second opening therein at substantially right angles to said first opening to receive a trunk abutment member.

8. A combined strap anchor and trunk abutment comprising a member having an opening therein adapted to receive a strap, and a resilient member secured in said first member in a plane at substantially right angles to said strap receiving opening, said resilient member having a face projecting beyond said first named member.

Signed by me at Detroit, Michigan, U. S. A., this 21st day of July, 1924.

JOSEPH H. BOURGON.